LEONARD D. LEHMANN
INVENTOR

ATTORNEY

3,697,347
PROCESS OF PREPARING AIR-PERVIOUS SPOT-BONDED NONWOVEN FABRICS

Leonard T. Lehmann, Newark, Del., assignor to Hercules Incorporated, Wilmington, Del.
Continuation-in-part of application Ser. No. 610,855, Jan. 23, 1967. This application Dec. 22, 1969, Ser. No. 887,455
Int. Cl. D04h 1/58, 1/72
U.S. Cl. 156—81        5 Claims

ABSTRACT OF THE DISCLOSURE

A process of forming air-pervious reinforced nonwoven fabrics comprises heating a nonwoven web in contact with a thermoplastic net material which has uniformly spaced thick portions connected by thinner strands. The temperature is sufficiently high to melt the net material, causing the strands to draw back into the thick portions making uniformly spaced spots of melted thermoplastic material.

---

This application is a continuation-in-part of my application Ser. No. 610,855, filed Jan. 23, 1967, now abandoned.

This invention relates to the preparation of reinforced nonwoven fabrics and to the fabrics so produced. More particularly, this invention relates to the preparation of air-pervious reinforced nonwoven fabrics whereby a nonwoven web is bonded by heating in close contact with an open network oriented thermoplastic sheet.

Nonwoven webs have been known for a number of years; however, their general use and acceptance have been limited by their lack of integrity and strength. Various methods have been employed to try to improve these properties. For exaample, they have been reinforced by bonding with a sheet or film of thermoplaastic material. While this adds strength and integrity to the fabric it also increases stiffness and decreases ability to breathe (i.e., air permeability).

It has now been discovered that nonwoven webs of little or no strength can be transformed into strong, integrally reinforced nonwoven fabrics, which are at the same time soft, flexible and have the desirable ability to breathe, by heating an oriented thermoplastic net material, as described below, in close contact with a nonwoven web so as to melt the thermoplastic and spot bond the nonwoven fibers.

The nonwoven webs to be reinforced in accordance with the process of this invention can be of any material which is suitable for the purpose for which said reinforced fabric is to be used. Exemplary webs are nonwoven polyolefins, such as polypropylene; cotton; wool; regenerated celluloses; cellulose acetate; polyamides; acrylates; vinyls; polyesters; etc. Various types of nonwoven webs such as carded, garnetted or random laid webs can be used. In addition nonwoven webs prepared by fibrillating staple length strips of striated plastic film in a carding machine and random or cross-laying the resulting fibers into a nonwoven web can be used. If desired, the fibers within the webs can be varied as to composition. For example, a web comprising a mixture of natural and synthetic fibers such as a mixture of wool and a polyamide can be used.

Any thermoplastic net material can be employed in the process of this invention provided that it has uniformly spaced solid thick thermoplastic masses connected by oriented thermoplastic strands which are thinner than the said solid portions, is air-pervious and melts at a temperature below the temperature at which the fibers of the nonwoven web melt or otherwise become degraded. Thus it can be seen that the choice of thermoplastic material used depends upon the nonwoven web to be reinforced. For example, when reinforcing a nonwoven cellulose acetate the thermoplastic used must have a melting point below about 190° C. On the other hand, thermoplastics having much higher melting points can be used when reinforcing nonwoven cottons. The choice of open network thermoplastic material to be used with any specific web will be readily apparent to those skilled in the art. Preferred thermoplastics are high and low density polyethylene, polypropylene, polyesters, polyamides, ethylene copolymers such as ethylene-propylene copolymers, ethylene-vinyl acetate copolymers, ethylene-methyl acrylate copolymers, etc. Best results are obtained when using thermoplastic material with a high melt flow, so that it more readily encircles and entraps the fibers. For example, in the case of polyethylene best results are obtained when using high density polyethylene having a melt index ($I_2$ at 190° C.) of at least 10. Various configurations of thermoplastic netting can be employed. In each case the configuration will be such as to result in uniform spots or globs of thermoplastic material when the netting is heated to its melting point. Typical configurations are shown by way of example in FIGS. 1 through 8.

Figure 1:
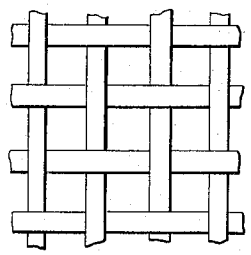
FIG. 1 shows in plan, a portion of an open network of thermoplastic material in sheet form, to an enlarged scale, comprising interwoven, spaced parallel strands of circular section.

It will be readily apparent to those skilled in the art that innumerable other configurations can be employed in the process of this invention. The only limitations are that the open network thermoplastic material will comprise uniformly spaced solid thick masses connected by oriented strands, bands, threads or the like which are thinner than the solid portions and which also act as spacers to keep the said solid portions uniformly spaced apart as shown in the figures of the drawing. When the net is heated these strands, bands, threads or the like can melt and draw back into the solid portions making uniformly spaced spots or globs of melted thermoplastic material.

The thermoplastic net materials employed in the process of this invention can be formed in many ways, including molding, the laying of spaced strands or threads of desired cross-section onto other similarly spaced strands or threads arranged at a right angle to the first mentioned spaced strands or threads and integrating the strands or threads at the crossing areas, or the weaving together of such strands or threads. A particularly preferred method of forming the open network thermoplastics is described in British Pat. Ser. No. 914,489, published Jan. 2, 1963.

In general the open network thermoplastic material will have from about 25 openings per square inch to about 1200 openings per square inch and will weigh from about 0.3 ounce per square yard to about 3.0 ounces per square yard. The thickness of the open network will be from about 1 to about 15 mils.

As stated above the process of this invention comprises heating a nonwoven web in close contact with the thermoplastic net material at a temperature sufficiently high to melt said thermoplastic. The process can be carried out by inserting the net between two nonwoven webs or by applying the net to one or both sides of the nonwoven web. In another variation of the process the net can alternatively be inserted between nonwoven webs, the only limitation on the number of layers being the air permeability desired for the finished fabric.

The temperature at which the thermoplastic net and nonwoven web are heated will depend upon the melting point of the specific thermoplastic employed, the specific nonwoven web, the thickness of the structure, the period of time the structure is to be heated, etc. In general, the temperature of heating will be from about 110° C. to about 250° C. and the period of time the materials will be subjected to heat will be from about 5 seconds to about 5 minutes. In order to keep the net in close contact with the the nonwoven web, it is desirable to keep the structure under pressure while heating as, for example, from about 1 p.s.i. to about 25 p.s.i.

The process of this invention can be conducted by various methods. For example, the materials can merely be heated in a press or passed through the nip of heated rollers or passed taunt over a large heated roller. Another method of heating the materials is by passing hot gasses through the structure. This latter method may be preferred since it is faster than the other methods and there is less chance of degrading the fibers of the web. It is faster since there is no trapped air in the web to act as an insulator and there is less chance of degrading the fibers since lower temperatures can be used to accomplish the bonding. Any inert hot gas can be used in this method but, since they are readily available and inexpensive, air or superheated steam will usually be employed. The hot gas will be moved through the structure at a rate of speed sufficient to overcome the insulating properties of the stagnant air trapped within the structure. When using hot gas to accomplish the bonding, the structure can be pressed between metal screens or, in continuous operations, passed over a perforated or screen drum while passing hot gasses therethrough.

In general the net reinforced nonwovens of this invention can be used for liner fabrics, filter cloths, shade cloths for crops, backing fabrics for tufted structures, disposable fabrics (e.g., surgical dressings, bed sheets, pillow coverings, surgical gowns, etc.), and so forth.

The following examples will serve to illustrate the invention.

EXAMPLE 1

Figure 7:
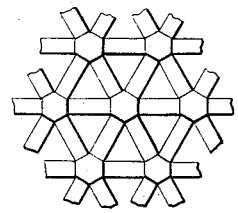
FIG. 7 shows in plan, and FIG. 8 in a fragmentary perspective view, another open network of thermoplastic material of a similar type to that shown in FIGS. 5 and 6.
Figure 8:
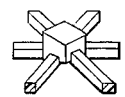

A three layer cross-lapped garnetted, three-denier per filament by two inch polypropylene web weighing 1.6 ounces per square yard and having little or no tensile or tear strength was reinforced with a high density polyethylene net having a configuration as shown in FIGS. 7 and 8, a weight of approximately 0.5 ounce per square yard and containing approximately 780 openings per square inch. The polypropylene from which the web was prepared had an intrinsic viscosity of 2.5 (0.1% in decahydronaphthalene at 135° C.). A 12 by 12 inch sheet of the nonwoven polypropylene web and an 11 by 11 inch sheet of the polyethylene net were super-imposed on upon the other and placed in a platen press. The structure was heated at a temperature of 149° C. under a pressure of 10 p.s.i. for 3 minutes and then trimmed to 11 by 11 inches. The resulting reinforced fabric had a tensile strength of approximately 8.5 pounds per inch width in both directions and a pierce tear stress of approximately 6.0 pounds at 200% elongation. The fabric was soft, flexible and closely resembled the bond of a well-laundered sheet and had an air permeability of greater than 1800 cc. per minute per square inch (ASTM-D-726, Method A). Examination of the fabric with a magnifying glass showed that the web had been bonded by approximately 580 evenly spaced bonding points per square inch. The area between these bonding points or spot bonds was filled with loose, flexible, unbonded fibrils which presented little or no resistance to the passage of air.

EXAMPLE 2

A four-layer cross-lapped garnetted 15-denier per filament by three-inch polypropylene web weighing 2.0 ounces per square yard and having little or no tensile or tear strength was reinforced with a high density polyethylene net having a configuration as shown in FIGS. 7 and 8, a weight of approximately 0.5 ounce per square yard and containing approximately 1092 openings per square inch exactly as described in Example 1. The polypropylene from which the web was prepared had an intrinsic viscosity of 2.5 (0.1% in decahydronaphthalene at 135° C.). The resulting reinforced fabric had a tensile strength of approximately 13.5 pounds per inch width in both directions and a pierce tear stress of approximately 13.5 pounds at 200% elongation. The uniformly spot bonded fabric was soft and flexible having an air permeability of greater than 1800 cc. per minute per square inch (ASTM-D-726, Method A).

EXAMPLE 3

A random laid 15 to 25 denier per filament continuous filament polypropylene web weighing one ounce per square yard and having little or no tensile and tear strength was reinforced with the high density polyethylene net described in Example 2. The polypropylene used in the web was as described in Example 2. An 11 by 11 inch sheet of the net was placed between two 12 by 12 inch sheets of the nonwoven polypropylene web and the resulting structure placed in a platen press. The structure was heated under pressure as described in Example 1 and trimmed to 11 by 11 inches. The resulting reinforced fabric had a tensile strength of approximately 15 pounds per inch width in both directions and a pierce tear stress of approximately 16 pounds at 200% elongation. The uniformly spot bonded fabric was soft and flexible having an air permeability of greater than 1800 cc. per minute per square inch (ASTM-D-726, Method A).

EXAMPLE 4

Figure 5:
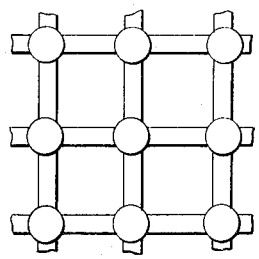
FIG. 5 is a plan of a portion of an open network of a thermoplastic material in sheet form, to an enlarged scale, comprising circular solid bosses connected by strands.
Figure 6:
FIG. 6 is a sectional view of such bosses and aligned strands.

A four-layer cross-lapped garnetted, three-denier per filament by four inch cotton web weighing 1.6 ounces per square yard and having little or no tensile strength was reinforced with a stereoregular polypropylene net having a configuration as shown in FIGS. 5 and 6, a weight of approximately 1.78 ounces per square yard and containing approximately 240 openings per square inch. The polypropylene in the net had a melting point of approximately 160° C. and a molecular weight of 250,000. An 11 by 11 inch sheet of the net was placed between two 12 by 12 inch sheets of the nonwoven cotton web and the assembly passed over a heated roll while being pressed against the roll by a tensioned continuous cloth belt. The temperature of the roll was 192° C. and the contact time was 1.5 minutes. The resulting reinforced fabric was trimmed to 11 by 11 inches and tested for tensile strength and pierce tear stress. It was found to have a tensile strength of approximately 18 pounds per inch width in both directions and pierce tear stress of approximately 17 pounds at 200% elongation. The fabric had a soft hand, was flexible and had an air permeability of greater than 1000 cc. per minute per square inch. Examination of the fabric with a magnifying glass showed that the web had been bonded by approximately 210 evenly spaced bonding points per square inch.

EXAMPLE 5

Figure 2:
FIG. 2 shows in elevation, the interwoven network of FIG. 1.
Figure 3:
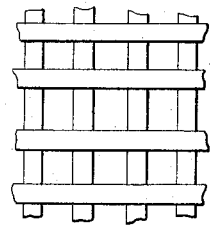
FIG. 3 shows in plan, and FIG. 4 in elevation, another open network of thermoplastic material in sheet form, to an enlarged scale, comprising spaced parallel strands of rectangular section overlaying and made integral with similar strands at right angles thereto.
Figure 4:
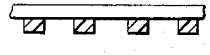

A four-layer cross-lapped garnetted, three-denier per filament by three-inch viscose rayon web weighing 1.6 ounces per square yard and having little or no tensile strength was reinforced with a low-density branched chain polyethylene net having a configuration as shown in FIGS. 1 and 2, a weight of approximately 1.2 ounces per square yard and containing approximately 290 openings per square inch, exactly as shown in Example 4 except the temperature of the roll was 125° C. The polyethylene in the net had a molecular weight of approximately 150,000. The resulting fabric had a tensile strength of approximately 18 pounds per inch width in both directions and a pierce tear stress of approximately 16.5 pounds at 200% elongation. The fabric was soft to the touch, relatively flexible and had an air permeability of over 500 cc. per minute per square inch. Examination of the fabric with a magnifying glass showed approximately 260 evenly spaced bonding points per square inch.

EXAMPLE 6

A net of high density polyethylene, 12 inches square, having a melt index ($I_2$ at 190° C.) of 15, a configuration as shown in FIGS. 7 and 8, a weight of approximately 0.5 ounce per square yard and containing approximately 180 openings per square inch was inserted between two 12 inch square 90° cross-overlaid webs of polypropylene continuous filaments forming a sandwich type structure. Each web weighed approximately 0.75 ounce per square yard. The continuous filaments of the webs were prepared from uniaxially oriented ribbons of crystalline polypropylene, having a molecular weight of approximately 400,000, and having striations extending lengthwise in the direction of orientation by fibrillation with a beater bar. The sandwich structure was placed between sheets of 16 mesh wire screen and heated in a press at a temperature of 196° C. under a pressure of 15 p.s.i. for five minutes. The resulting fabric weighed approximately 2.0 ounces per square yard, had the appearance of a coarse home spun fabric and a tensile strength of approximately 60 pounds per inch width in both directions.

EXAMPLE 7

A net of high density polyethylene 12 inches square, exactly as described in Example 6, was inserted between two 12-inch square random laid webs of polypropylene continuous filaments, forming a sandwich structure. Each web weighed approximately 1.0 ounce per square yard. The webs were formed by fibrillation of a linearly oriented striated crystalline polypropylene ribbon, as described in Example 6, in a high velocity air jet with simultaneous deposition on a wire screen. The structure was bonded in a heated press exactly as described in Example 6. The resulting fabric weighed approximately 2.5 ounces per square yard, had a tensile strength of approximately 25 pounds per inch width, and was suitable for use as carpet backing.

EXAMPLE 8

A net of high density polyethylene 12 inches square, exactly as described in Example 6, was inserted between two 12-inch square 90° cross-overlaid parallel arrays of multifilament polypropylene yarns. The polypropylene yarns used in the webs were approximately 2,000 denier and were prepared from the fibrillated polypropylene continuous filaments described in Example 6. The structure was bonded in a heated press exactly as described in Example 6. The resulting fabric weighed approximately 3.0 ounces per square yard, had a tensile strength of approximately 72 pounds per inch width in both directions and was suitable for use as upholstery fabric.

What I claim and desire to protect by Letters Patent is:

1. A process of preparing air-pervious spot bonded nonwoven fabrics which comprises heating a random laid web of fibers under pressure in close contact with a thermoplastic net material comprising uniformly spaced solid thick thermoplastic masses connected by oriented thermoplastic strands which are thinner than the said solid portions, at a temperature sufficiently high to melt said net material, but below the temperature at which the said random laid web of fibers melts, causing the thinner strands of said net material to draw back into the solid portions making uniformly spaced spots of melted thermoplastic material.

2. The process of claim 1 wherein the thermoplastic net material is polyethylene.

3. A process of preparing air-pervious spot bonded nonwoven fabrics which comprises heating a cross-lapped garnetted web of fibers under pressure in close contact with a thermoplastic net material, comprising uniformly spaced solid thick thermoplastic masses connected by oriented thermoplastic strands which are thinner than the said solid portions, at a temperature sufficiently high to melt said net material, but below the temperature at which the said cross-lapped garnetted web of fibers melts, causing the thinner strands of said net material to draw back into the solid portions making uniformly spaced spots of melted thermoplastic material.

4. The process of claim 3 wherein the nonwoven is a polypropylene web.

5. A process of preparing air-pervious spot bonded nonwoven fabrics which comprises heating a web of cross-overlaid parallel arrays of filaments under pressure in close contact with a thermoplastic net material, comprising uniformly spaced solid thick thermoplastic masses connected by oriented thermoplastic strands which are thinner than the said solid portions, at a temperature sufficiently high to melt said net material, but below the temperature at which the said web of cross-overlaid parallel arrays of filaments melts, causing the thinner strands of said net material to draw back into the solid portions making uniformly spaced spots of melted thermoplastic material.

References Cited
UNITED STATES PATENTS

| | | | |
|---|---|---|---|
| 2,919,467 | 1/1960 | Mercer | 18—12 |
| 3,444,025 | 5/1969 | Hillas | 156—306 |
| 3,276,944 | 10/1966 | Levy | 161—150 |
| 3,474,952 | 10/1969 | Cover, Jr. et al. | 156—306 X |
| 3,464,876 | 9/1969 | Barb | 156—306 X |
| 3,442,736 | 5/1969 | Duns | 161—87 X |

REUBEN EPSTEIN, Primary Examiner

U.S. Cl. X.R.

156—306; 161—148